Patented Sept. 8, 1936

2,053,817

UNITED STATES PATENT OFFICE 2,053,817

AZO-DYESTUFFS

Friedrich Felix and Wilhelm Huber, Basel, Switzerland, assignors to the firm Society of Chemical Industry in Basle, Basel, Switzerland No Drawing. Application March 21, 1935, Serial No. 12,299. In Switzerland March 24, 1934

9 Claims. (Cl. 260—92)

This invention relates to the manufacture of dyestuffs by coupling a diazotized aromatic amine of the general formula

in which Y stands for a sulfone radical of the general formula $SO_2$—$CH_2$—R wherein R represents H, alkyl or phenyl, and X stands for a nitrogenous group which is linked with its nitrogen atom to the organic radical, such as a $NO_2$-group, an

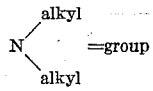

an

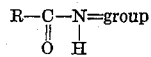

(R representing hydrogen, alkyl, aralkyl or aryl), e. g., an acidylamino-group, such as an acetylamino- or benzoylamino-group, with a coupling component of the general formula

in which A stands for a nucleus of the naphthalene series which carries a sulfo-group, and $R_1$ and $R_2$ each stand for hydrogen, alkyl, aryl or aralkyl radicals, the conditions of coupling being chosen in such a manner that the

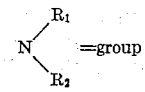

is the group which causes coupling.

The term "alkyl radicals" comprises not only the radicals of hydrocarbons, such as methyl, ethyl, propyl or butyl radicals, and the like, but also, as used in the scientific literature, cf. "Anthracene and Anthraquinone" by E. de Barry Barnett, London 1921, page 207, and in the patent literature cf. British Patent 26,336/1910 Claim 1, substituted alkyl radicals, for example, alkyl radicals substituted by halogen, such as, for example, chloro- bromo- or iodo-ethyl radicals, alkyl radicals substituted by OH-groups, such as hydroxyethyl-, hydroxypropyl-, hydroxybutyl- or dihydroxypropylene radicals, further the ethers and esters thereof, such as methoxyethyl- or acetoxyethyl- or ethylsulfuric acid radicals, further also alkylcarboxylic acid radicals and their derivatives, such as propionic acid radicals or propionic ester radicals or propionic acid amide radicals, or the radicals of ethylnitrile or ethylsulfocyanide. The aryl- or aralkyl-radicals $R_1$ and $R_2$ may also be substituted in the aromatic nucleus.

As products of the general formula

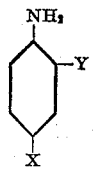

there may be named, for instance, 1-amino-4-nitrobenzene-2-methyl- (or 2-ethyl or 2-benzyl- or 2-hydroxyethyl or 2-hydroxybenzyl- or 2-carboxymethyl- or carboxymethylester-methyl)-sulfone, the corresponding 1-amino-4-nitro-5-chlorobenzene-2-alkylsulfones, the corresponding 1-amino-4-nitro-6-chlorobenzene-2-alkylsulfone, the corresponding sulfones in which the chlorine is exchanged for bromine or iodine, and 1-amino-4, 6-dinitrobenzene-2-methysulfone, further the 1-amino-4-acetylaminophenyl-2-methylsulfone, the 1-amino-4-acetylaminophenyl-2-ethylsulfone, the 1-amino-5-chloro-4-acetylaminophenyl-2-methylsulfone, the 1-amino-4-benzoylaminophenyl-2-methylsulfone, the 1-amino-4-(4'-methoxy)-benzoylaminophenyl-2-methylsulfone, the 1-amino-4-(4'-chloro)-benzoylaminophenyl-2-methylsulfone, the 1-amino-4-benzoylaminophenyl-2-ethylsulfone, the 1-amino-4-benzoylaminophenyl-2-benzylsulfone, the 1-amino-4-phenoxyacetylaminophenyl-2-methylsulfone, the 1-amino-4-(4'-ethoxy)-phenoxyacetylaminophenyl-2-methylsulfone, 1-amino-4-(2'-methyl)-phenoxyacetylaminophenyl-2-ethylsulfone, the 1-amino-4-phenylacetylaminophenyl-2-methylsulfone, the 1-amino-4-dimethylaminophenyl-2-ethylsulfone, the 1-amino-4-diethylaminophenyl-2-ethylsulfone, and the like.

As coupling components of the general formula

also explained above, there are suitable any sulfonated amino- naphthalene compounds capable of coupling, such as the true sulfonic acids of the following compounds: α- and β-naphthylamine, 1-N-methoxyethylaminonaphthalene of the formula

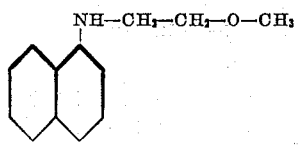

2 - N - methoxyethylaminonaphthalene, 1 - N - hydroxyethylaminonaphthalene, 2-N-hydroxyethylaminonaphthalene, further aminonaphthols such as, for example, 1-amino-5-hydroxynaphthalene, 1-amino-6-hydroxynaphthalene, 1-amino-7-hydroxynaphthalene, 1-amino-8-hydroxynaphthalene, 2-amino-3-hydroxynaphthalene, 2-amino-4-hydroxynaphthalene, 2-amino-5-hydroxynaphthalene, 2-amino-6-hydroxynaphthalene, 2-amino-7-hydroxynaphthalene, 2-amino-8-hydroxynaphthalene, further the corresponding alkylamino-hydroxynaphthalenes such as, for example, 1-methylamino-5-hydroxynaphthalene, 1-hydroxyethylamino-5-hydroxynaphthalene and the like.

Among these true sulfonic acids of the above cited compounds there may be named inter alia 1-amino-5-hydroxynaphthalene-7-sulfonic acid, 2-amino-8-hydroxynaphthalene-6-sulfonic acid, 2-ethylaminonaphthalene-6-sulfonic acid, and the like.

If the coupling component of the general formula

contains no phenolic OH-group in the aromatic nucleus A of the naphthalene series, the expression "coupling conditions in which the amino group

causes coupling" means the coupling of the component in neutral or acid medium usual for aromatic amines. However, if the aromatic nucleus A contains one or more phenolic OH-groups, coupling should be carried out in acid medium. But, as is well known, the selection of the coupling conditions in such a manner that the amino group of a coupling component is the group which causes coupling does not present a problem to the expert, but a known measure.

The dyestuffs thus produced can be converted into other valuable products by treating them with suitable reducing agents so that the nitro-group of the diazo-component is reduced, and, if desired, either acylating or alkylating the new amino-group by means of the usual agents, or converting the reduced body into other dyestuffs by diazotizing the amino-group and coupling with suitable coupling components.

The new dyestuffs correspond therefore to the general formula

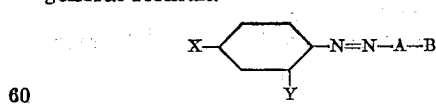

in which X stands for a nitrogenous group which is linked with its nitrogen atom to the aromatic nucleus, such as an NO₂-group, an NH₂-group, an

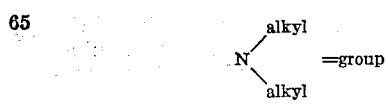

an

($R_1$ representing hydrogen, alkyl, aralkyl or aryl) i. e. an acetylamino or benzoylamino-group, a phenylacetylamino- or phenoxyacetylamino-group, Y stands for a sulfone radical of the general formula $SO_2$—$CH_2$—R (R representing H, alkyl or aryl), A for a sulfonated aromatic nucleus of the naphthalene series, and B for an amino-group

wherein R stands for H, alkyl or aralkyl, which amino-group stands in 2- or 4-position to the —N=N-group.

The dyestuffs thus obtained are red to black powders, which are excellently suitable for dyeing textiles of various kinds, for example wool and silk, and are also suitable for dyeing lacquers, varnishes and plastic masses.

They are dark powders dissolving in water with addition of alkalies to orange, to red, to violet and blue solutions and dyeing wool from an acid bath similar tints of good fastness properties. Among these dyestuffs those are particularly valuable which derive from the 2-amino-8-hydroxynaphthalene-6-sulfonic acid, and among this smaller group those dyestuffs in which the group X stands for an N-acidyl-group, particularly an N-acetylamino-group or an N-benzoylamino-group. These dyestuffs correspond to the general formula

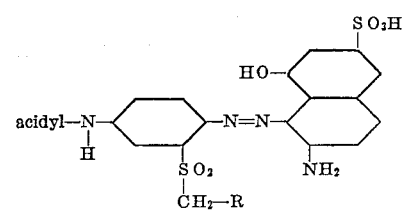

in which R stands for hydrogen, alkyl or phenyl. They are dark powders, dissolving in water with addition of alkalies to red to Bordeaux red solutions, and dyeing wool similar tints of very good fastness, particularly excellent fastness to light, which are very level.

The following examples illustrate the invention, the parts being by weight:—

*Example 1*

288 parts of 2-amino-5-nitrophenylbenzylsulfone are diazotized in concentrated sulfuric acid and the diazo-solution is diluted with ice-water and coupled with 239 parts of 2-amino-8-hydroxynaphthalene-6-sulfonic acid. The dyestuff thus formed is filtered when coupling is complete and washed until neutral. By dissolving it in hot water and precipitating it with sodium chloride the dyestuff may be purified, if desired. When dry it is a dark powder which dissolves in hot water to a blue solution and dyes wool in an acid bath fast blue tints. The dyestuff corresponds with the formula

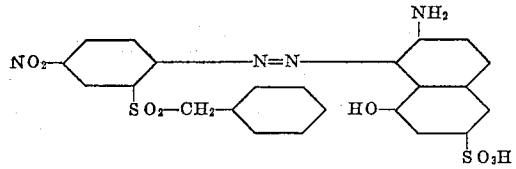

The substitution of the 2-amino-5-nitro-phenylbenzylsulfone by the corresponding methyl- or ethylsulfone leads to violet dyestuffs. By cautious reduction and acylation of the $NH_2$-group thus produced there are obtained products which may be identical with those of the following example.

Example 2

242 parts of 2-amino-5-acetylamino-phenylethylsulfone are converted into the diazo-compound by addition of hydrochloric acid and 69 parts of sodium nitrite. Into this diazo-solution there is introduced a neutral solution of 239 parts of 2-amino-8-hydroxynaphthalene-6-sulfonic acid and the reaction is accelerated by addition of sodium acetate. The dyestuff is filtered and washed. It is a dark red powder, which dyes wool in an acid bath fast bluish red tints. The dyestuff corresponds with the formula

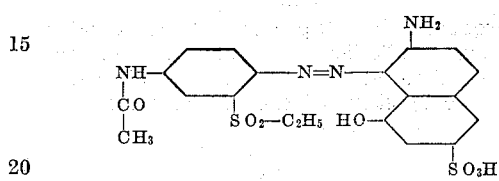

Similar dyestuffs are obtained by using analogous sulfones as diazo-components, for example 2-amino-5-acetylamino-phenylmethylsulfone or 2 - amino - 5 - acetylaminophenylbenzylsulfone. Further, instead of the N-acetyl-compounds, the N-benzoyl-compounds may be used or the chloroaectyl-compounds or the like. In this case red to violet dyestuffs are obtained which have good dyeing properties.

In the following table there are listed some other dyestuffs obtainable in accordance with this invention:—

| | Diazo-component | Coupling component | Color of the solution in water | Dyeing on wool |
|---|---|---|---|---|
| 1 | 2-amino-5-nitro-phenyl-ethylsulfone | 2-amino-8-hydroxy-naphthalene-6-sulfonic acid (acid coupled) | Blue-violet | Red-blue |
| 2 | 2-amino-5-nitro-phenyl-methylsulfone | ...do... | ...do... | Do. |
| 3 | 2-amino-5-acetyl-amino-phenyl-methylsulfone | 2-aminonaphthalene-6-sulfonic acid | Red-orange | Red-orange |
| 4 | ...do... | 2-amino-8-hydroxy-naphthalene-6-sulfonic acid (acid coupled) | Red | Bluish-red |
| 5 | 2-amino-5-acetyl-amino-phenyl-benzylsulfone | 2-aminonaphthalene-6-sulfonic acid | Scarlet | Scarlet |
| 6 | 2-amino-5-benzoylamino-phenylmethylsulfone | 2-amino-8-hydroxy-naphthalene-6-sulfonic acid (acid coupled) | Bordeaux | Bordeaux |
| 7 | 2-amino-5-nitro-phenyl-methylsulfone | 2-phenylamino-8-hydroxy-naphthalene-6-sulfonic acid (acid coupled) | Green-blue | Green-blue |
| 8 | 2-amino-5-nitro-phenyl-methylsulfone | 1-amino-5-hydroxy-naphthalene-7-sulfonic acid (acid coupled) | ...do... | Do. |

Example 3

2.5 parts of the dyestuff obtained as described in Example 2 are boiled with 1000 parts of water. A dye-bath is prepared with 2500 parts of water at 50–60° C. to which there are added the dissolved dyestuff and 500 parts of water rinsings. To the dye-bath comprising 4000 parts of liquor there are added 10 parts of crystallized sodium sulfate; 100 parts of wool are entered at 50–60° C. and 40 parts of sulfuric acid of 10 per cent. strength are added. The whole is warmed gradually to 85–90° C. and dyeing is continued for 1 hour at this temperature. The usual finishing operations follow, whereby there is obtained a very pure bluish-red dyeing of excellent properties of fastness.

What we claim is:

1. The azo-dyestuffs of the general formula

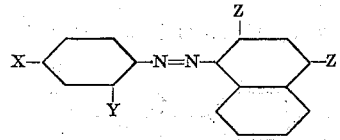

in which X stands for a nitrogenous group selected from the group consisting of the nitro group, acyl-amino groups and dialkyl-amino groups and which is linked with its nitrogen atom to the aromatic nucleus, Y stands for a sulfone radical of the general formula $SO_2$—$CH_2$—$R_1$, $R_1$ standing for a member of the group consisting of hydrogen, alkyl and phenyl, in which formula further the naphthalene nucleus is sulfonated and does not contain more than one phenolic OH-group, one Z stands for an amino-group and the other Z for a hydrogen atom, the naphthalene nucleus carrying no other amino-groups than the amino-group Z, which products are dark powders soluble in pyridine to red, violet, blue and green solutions and dyeing lacquers and the fiber red to blue and green tints.

2. The azo-dyestuffs of the general formula

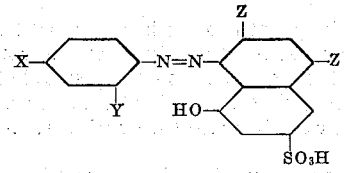

in which X stands for a nitrogenous group selected from the group consisting of the nitro group, acyl-amino groups and dialkyl-amino groups and which is linked with its nitrogen atom to the aromatic nucleus, Y stands for a sulfone radical of the general formula $SO_2$—$CH_2$—$R_1$, $R_1$ standing for a member of the group consisting of hydrogen, alkyl and phenyl, and one Z for an $NH_2$-group and the other Z for a hydrogen atom, which products are dark powders soluble in water with addition of alkalies to red to violet, blue and green-blue solutions, and dyeing wool from an acid bath fast red to violet to blue and green-blue tints.

3. The azo-dyestuffs of the general formula

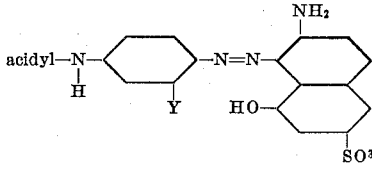

in which Y stands for a sulfone radical of the general formula $SO_2$—$CH_2$—$R_1$, $R_1$ standing for a member of the group consisting of hydrogen, alkyl and phenyl, which products are dark powders soluble in water on addition of alkalies to red to Bordeaux-red solutions and dyeing the wool in an acid bath blue-red to Bordeaux-red tints.

4. The azo-dyestuffs of the general formula

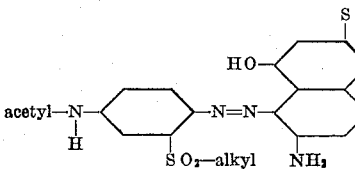

in which the alkyl radical is not substituted and does not consist of more than two carbon atoms, which products are dark powders soluble in water on addition of alkalies to red to bluish-red solutions and dyeing wool in an acid bath fast bluish-red tints.

5. The azo-dyestuffs of the general formula

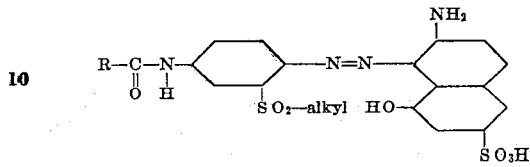

in which the alkyl radical is not substituted and does not consist of more than two carbon atoms, and in which R stands for an aromatic nucleus of the benzene series which products are dark powders soluble in water on addition of alkalies to Bordeaux-red solutions, and dyeing wool from an acid bath fast Bordeaux-red tints.

6. The azo-dyestuffs of the general formula

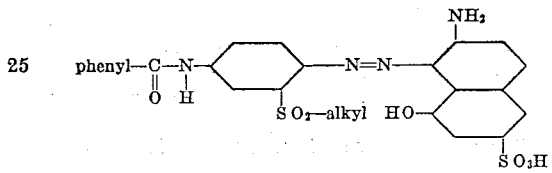

in which the alkyl radical is not substituted and does not consist of more than two carbon atoms, which products are dark powders soluble in water on addition of alkalies to Bordeaux-red solutions, and dyeing wool from an acid bath fast Bordeaux-red tints.

7. The azo-dyestuff of the formula

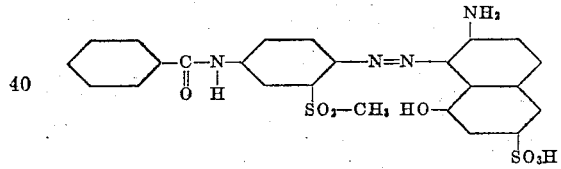

which product is a dark powder soluble in water on addition of alkalies to a Bordeaux-red solution, and dyeing wool from an acid bath fast Bordeaux-red tints.

8. The azo-dyestuff of the formula

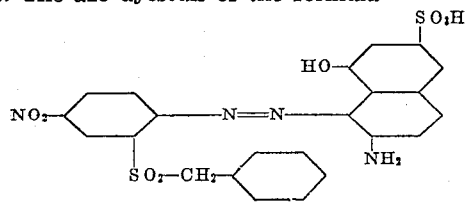

which product is a dark powder soluble in water on addition of alkalies to a blue solution, and dyeing wool from an acid bath fast blue tints.

9. The azo-dyestuffs of the general formula

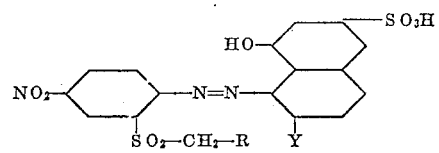

in which R stands for a member of the group consisting of hydrogen, alkyl and aryl and Y for an amino-group, which products are dark powders soluble in pyridine to violet, blue and green solutions and dyeing the fiber violet to blue and green tints.

FRIEDRICH FELIX.
WILHELM HUBER.